United States Patent [19]

Yuuki

[11] Patent Number: 5,191,763
[45] Date of Patent: Mar. 9, 1993

[54] DEVICE FOR CONTROLLING HEATING OF CATALYZER FOR PURIFYING EXHAUST GAS

[75] Inventor: Kiyoshi Yuuki, Susono, Japan

[73] Assignee: Toyota Jidosha Kabushiki Kaisha, Japan

[21] Appl. No.: 897,034

[22] Filed: Jun. 11, 1992

[30] Foreign Application Priority Data

Aug. 2, 1991 [JP] Japan .................................. 3-194327

[51] Int. Cl.⁵ ............................................. F01N 3/20
[52] U.S. Cl. ...................................... 60/284; 60/286; 60/300; 422/174
[58] Field of Search ................. 60/300, 284, 274, 286; 422/174

[56]  References Cited

U.S. PATENT DOCUMENTS

| 3,723,070 | 3/1973 | Houdry | 60/300 |
| 3,770,389 | 10/1973 | Kitzner et al. | |
| 3,886,739 | 6/1975 | Lee | 60/300 |
| 4,102,127 | 7/1978 | Saiki et al. | |
| 4,698,966 | 10/1987 | Distel | 60/286 |
| 5,146,743 | 9/1992 | Maus | 60/300 |

FOREIGN PATENT DOCUMENTS

2756570 9/1978 Fed. Rep. of Germany ........ 60/300
47-22313 11/1972 Japan .

Primary Examiner—Douglas Hart
Attorney, Agent, or Firm—Oliff & Berridge

[57]  ABSTRACT

A device for controlling the heating of a catalyzer arranged in the exhaust passage of an engine. When the engine is started, the catalyzer is rapidly heated by the heater, and the time for which the power is supplied to the heater is increased as the catalyzer use period becomes longer, to thus increase the temperature of the catalyzer to the activation temperature thereof when the power supply to the heater is stopped regardless of whether the catalyzer is new or has deteriorated.

18 Claims, 9 Drawing Sheets

DEVICE FOR CONTROLLING HEATING OF CATALYZER FOR PURIFYING EXHAUST GAS

BACKGROUND OF THE INVENTION

1. Field of the Invention

The present invention relates to a device for controlling the heating of a catalyzer for purifying an exhaust gas.

2. Description of the Related Art

A catalyzer for purifying the exhaust gas is normally arranged in the exhaust passage of the engine, and when the engine is started, the temperature of the catalyzer is gradually increased due to the heating thereof by the exhaust gas. This exhaust gas purifying operation by the catalyzer, however, cannot be properly carried out until the catalyzer is activated, i.e., until the temperature of the catalyzer reaches an activation temperature, and accordingly, the exhaust gas cannot be purified by the catalyzer until the temperature of the catalyzer reaches the activation temperature thereof after the engine is started.

Therefore, in a known engine, an electric heater is provided for heating the catalyzer and is supplied with electric power for a predetermined time after the engine is started (see Japanese Unexamined Utility Model Publication No. 47-22313). In this engine, when the engine is started the catalyzer is rapidly heated, and accordingly, the temperature of the catalyzer rises rapidly to the activation temperature thereof, to thus purify the exhaust gas shortly after the engine is started.

If the catalyzer is used for a long time, however, and thus is deteriorated, the activation temperature at which the catalyzer starts the proper purifying operation of the exhaust gas becomes gradually higher as the catalyzer deteriorates. Nevertheless, as in the above-mentioned engine, where the electric heater is supplied with electric power for a predetermined time after the engine is started, the temperature of the catalyzer is increased only to a predetermined temperature, regardless of for how long the catalyzer is used. Accordingly, in this case, if the time for which the electric heater is supplied with electric power is determined such that the temperature of the catalyzer rises to the activation temperature when the catalyzer is new, the temperature of the catalyzer cannot be raised to the activation temperature before the supply of electric power to the electric heater is stopped, when the catalyzer has deteriorated. Accordingly, a problem arises in that, when the catalyzer has deteriorated, the exhaust gas cannot be purified for a short time after supply of electric power to the electric heater is stopped.

Conversely, by taking the deterioration of the catalyzer into consideration, if the time for which the electric heater is supplied with electric power is determined such that the temperature of the catalyzer still rises to the activation temperature even though the catalyzer has deteriorated, the temperature of the catalyzer becomes considerably higher than the activation temperature before the supply of power to the electric heater is stopped, when the catalyzer is new. Accordingly, in this case, a problem arises in that unnecessary energy is used for heating the catalyzer, and further, the catalyzer may be deteriorated sooner due to the excessive heating operation by the electric heater.

SUMMARY OF THE INVENTION

An object of the present invention is to provide a heating control device capable of rapidly increasing a temperature of the catalyzer to an activation temperature thereof, without using unnecessary energy.

According to the present invention, there is provided a device for controlling the heating of a catalyzer arranged in an exhaust passage of an engine, the device comprising: a heating means for heating the catalyzer; a calculating means for calculating a cumulative period of use of the catalyzer; and a control means for controlling the heating means in response to a result of the calculation by the calculating means, to temporarily heat the catalyzer when the engine is started and to increase an amount of heat applied to the catalyzer by the heating means as the cumulative period of use of the catalyzer becomes longer.

The present invention may be more fully understood from the description of preferred embodiments of the invention set forth below, together with the accompanying drawings.

DESCRIPTION OF THE PREFERRED EMBODIMENTS

Figure 1:
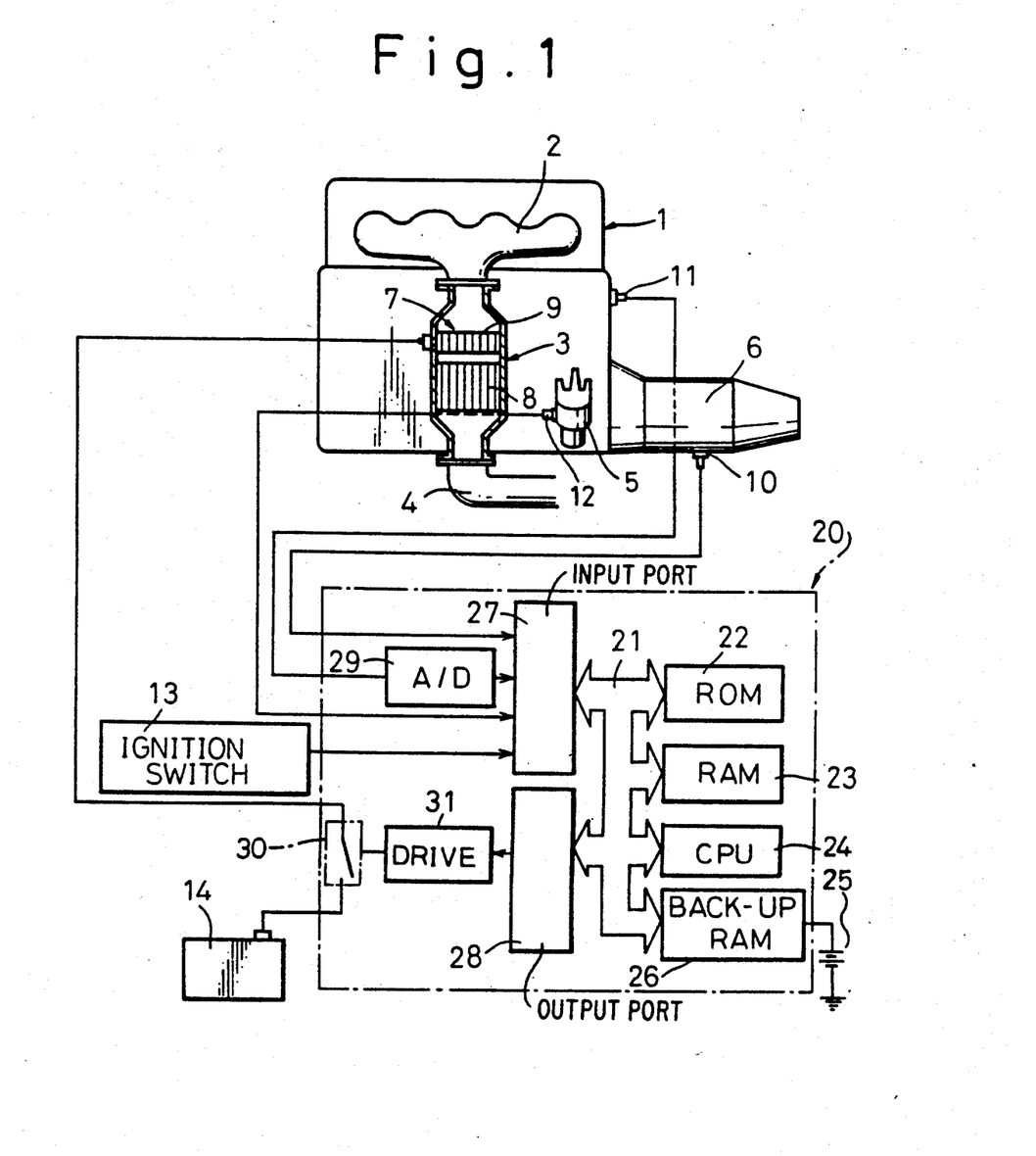
FIG. 1 is a general view of an engine.
Figure 2:
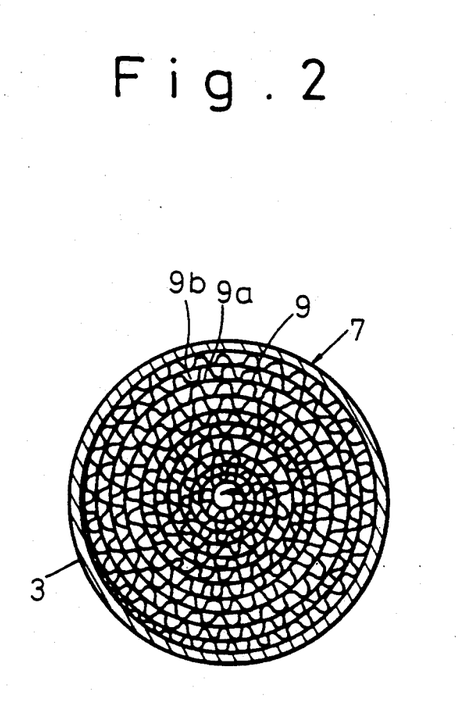
FIG. 2 is a cross-sectional side view of the catalyzer with a heater.

Referring to FIG. 1, reference numeral 1 designates an engine body, 2 an exhaust manifold, 3 a catalytic converter connected to the outlet of the exhaust manifold 2, 4 an exhaust pipe connected to the outlet of the catalytic converter 3, 5 a distributor, and 6 a transmission. A catalyzer 7 provided with an electric heater is arranged inside the catalytic converter 3, and further, a main catalyzer 8 also is arranged inside the catalytic converter 3, downstream of the catalyzer 7. As illustrated in FIG. 2, the catalyzer 7 has a shape such that a metallic thin plate 9a and a metallic corrugated plate 9b are alternately wound coaxially around a core, and a catalytic particles are carried by both the metallic thin plate 9a and the metallic corrugated plate 9b. Further, by causing a flow of electric current through the metallic thin plate 9a and metallic corrugated plate 9b, the metallic thin plate 9a and the metallic corrugated plate 9b are heated, whereby the catalytic particles carried by the plates 9a, 9b are heated. Accordingly, the plates 9a and 9b constitute a catalyzer carrier, and at the same time, function as a heater 9. This heater 9 is controlled by a signal output from an electronic control unit 20 illustrated in FIG. 1.

The electronic control unit 20 is constructed as a digital computer and comprises a ROM (read only memory) 22, a RAM (random access memory) 23, a CPU (microprocessor etc.) 24, a back-up RAM 26 continuously connected to a power source 25, an input port 27 and an output port 28. The ROM 22, the RAM 23, the CPU 24, the back-up RAM 26, the input port 27 and the output port 28 are interconnected via a bidirectional bus 21. A vehicle speed sensor 10 producing output pulses indicating a vehicle speed is attached to the transmission 6, and the output pulses of the vehicle speed sensor 10 are input to the input port 27. A coolant temperature sensor 11 producing an output voltage proportional to the temperature of the cooling water of the engine is mounted on the engine body 1, and the output voltage of the coolant temperature sensor 11 is input to the input port 27 via an AD converter 29. An engine speed sensor 12 producing output pulses representing the engine speed is mounted on the distributor 5, and the output pulses of the engine speed sensor 12 are input to the input port 27. In addition, a signal indicating that the ignition switch 13 is made ON is input to the input port 27. Further, the heater 9 of the catalyzer 7 is connected to a battery 14 via a semi-conductor switch 30, and this semi-conductor switch 30 is connected to the output port 28 via a drive circuit 31, and controlled by a signal output to the output port 28.

Figure 3:
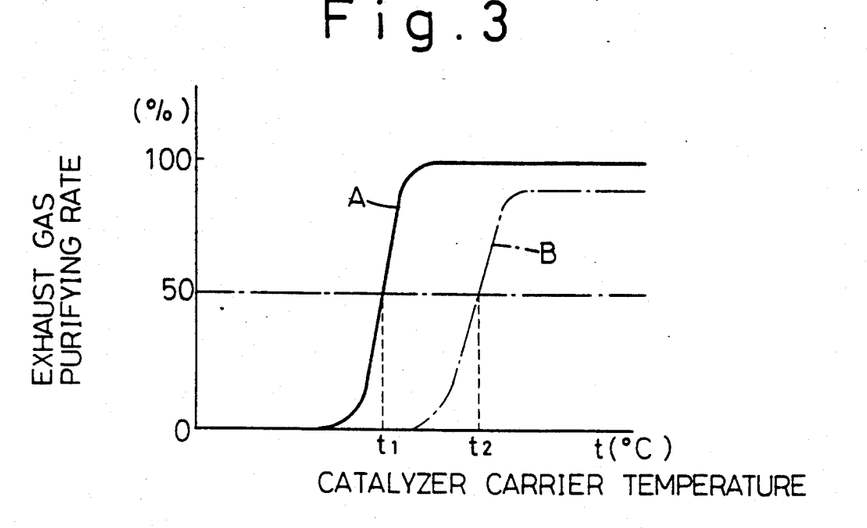
FIG. 3 is a diagram illustrating the relationship between the exhaust gas purifying rate and the temperature of the catalyzer carrier.

FIG. 3 illustrates the relationship between the temperature of the catalyzer carriers 9a, 9b and the exhaust gas purifying rate by the catalyzer 7 with a heater. In FIG. 3, the solid line A indicates the catalyzer 7, which is new, and the dash-dot line B indicates the catalyzer 7 which has been used for a long time and thus has deteriorated. Where the catalyzer 7 is new, when the temperature of the catalyzer carriers 7a, 7b rises to $t_1$, the exhaust gas purifying rate becomes equal to 50 percent, as illustrated by the solid line A in FIG. 3. Conversely, where the catalyzer 7 has been used for a long time, and thus has deteriorated, when the temperature of the catalyzer carriers 9a, 9b rises to $t_2$, which is higher than $t_1$, the exhaust gas purifying rate becomes equal to 50 percent, as illustrated by the dashed and dotted line B in FIG. 3. Accordingly, as can be seen from FIG. 3, the activated temperature of the catalyzer 7, at which the proper purifying operation of the exhaust gas is started, becomes higher as the period of use of the catalyzer 7 becomes longer. Therefore, to increase the temperature of the catalyzer 7 to the activation temperature, it is necessary to increase the amount of heat used for heating the catalyzer 7 as the period of use of the catalyzer 7 becomes longer.

Figure 4:
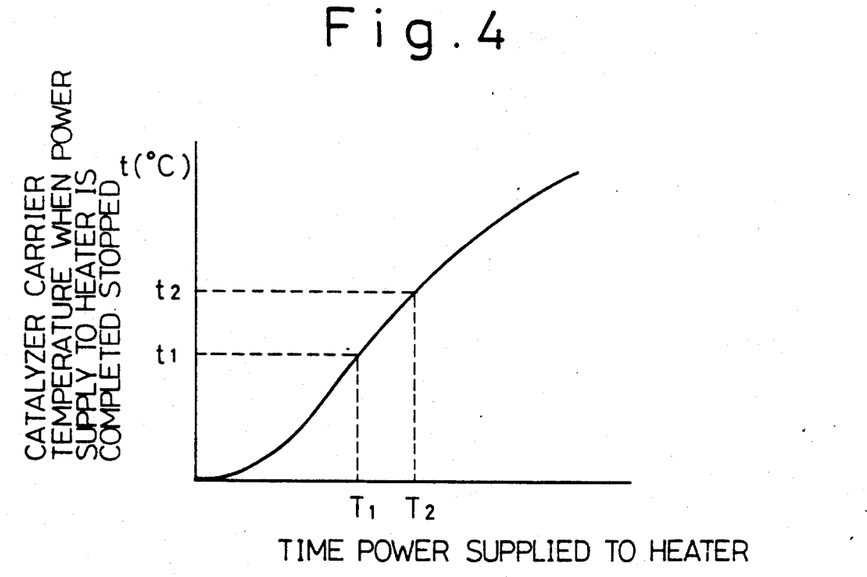
FIG. 4 is a diagram illustrating the relationship between the temperature of the catalyzer carrier and the time for which power is supplied to the heater.
Figure 5:
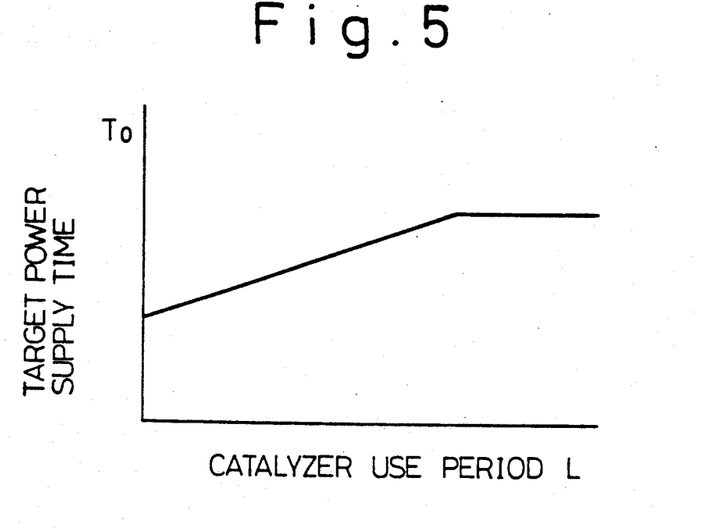
FIG. 5 is a diagram illustrating the target power supply time to the heater.

FIG. 4 illustrates the relationship between the time for which the heater 9 is supplied with electric power and the temperature of the catalyzer carriers 9a, 9b when the supply of power to the heater 9 is stopped. Since the degree of the deterioration of the catalyzer 7 does not have an influence on an increase in the temperature of the catalyzer carriers 9a, 9b when power is supplied to the heater 9, the relationship illustrated in FIG. 5 is the same regardless of whether the catalyzer 7 is new or has deteriorated. In FIG. 4, $T_1$ indicates the time for which power must be supplied to the heater for heating the catalyzer carriers 9a, 9b and increasing the temperature thereof to the temperature $t_1$ at which the exhaust gas purifying rate becomes equal to 50 percent when the catalyzer 7 is new, and $T_2$ indicates the time for which power must be supplied to the heater for heating the catalyzer carriers 9a, 9b and increasing the temperature thereof to the temperature $t_2$ at which the exhaust gas purifying rate becomes equal to 50 percent when the catalyzer 7 has deteriorated. Accordingly, where the amount of heat used for heating the catalyzer carriers 9a, 9b is controlled by controlling the time for which power is supplied to the heater, this power supply time must be made longer as the period of use of the catalyzer 7 becomes longer.

The relationship between the length of the period of use of the catalyzer 7 and the target heater power supply time required for increasing the temperature of the catalyzer 7 to the activation temperature can be obtained by experiments, and this relationship obtained by such experiments is shown in FIG. 5. As illustrated in FIG. 5, the target power supply time $T_0$ becomes longer as the catalyzer use period L becomes longer.

Figure 6:
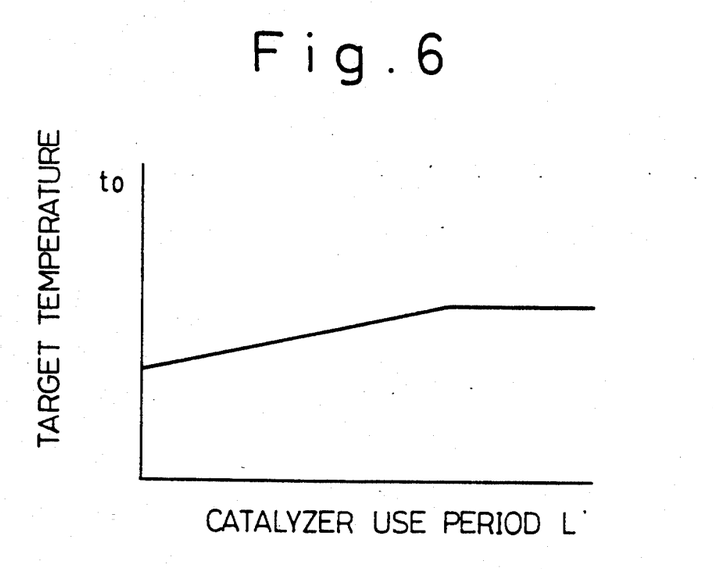
FIG. 6 is a diagram illustrating the target temperature of the catalyzer carrier.

In addition, as mentioned above, the activation temperature of the catalyzer 7 becomes higher as the period of use of the catalyzer 7 becomes longer. Accordingly, the temperature of the catalyzer carriers 9a, 9b, reached when the power supply to the heater 9 is stopped, must be increased as the period of use of the catalyzer 7 becomes longer. The relationship between the period of use of the catalyzer 7 and the target temperature of the catalyzer carriers 9a, 9b, at which the temperature of the catalyzer 7 is equal to the activation temperature thereof, can be obtained by experiments, and the relationship obtained by such experiments is shown in FIG. 6. As illustrated in FIG. 6, the target temperature $t_o$ of the catalyzer carriers 9a, 9b becomes higher as the catalyzer use period L becomes longer.

By using either one of the relationships illustrated in FIGS. 5 and 6, it is possible to increase the temperature of the catalyzer 7 to the activation temperature when the power supply to the heater 9 is stopped. Namely, where the relationship illustrated in FIG. 5 is used, by obtaining the catalyzer use period L and making the power supply time equal to the target power supply time $T_0$ corresponding to the catalyzer use period L in FIG. 6, it is possible to increase the temperature of the catalyzer 7 to the activation temperature when the power supply to the heater 9 is stopped. Conversely, where the relationship illustrated in FIG. 6 is used, by obtaining the catalyzer use period L and stopping the power supply to the heater 7 when the temperature of the catalyzer carriers 9a, 9b reaches the target temperature to corresponding to the catalyzer use period in FIG. 6, it is possible to increase the temperature of the catalyzer 7 to the activation temperature when the power supply to the heater 9 is stopped. When using the relationship illustrated in FIG. 6, however, the temperature of the catalyzer carriers 9a, 9b must be detected.

As mentioned above, by using either one of the relationship illustrated in FIGS. 5 and 6, it is possible to increase the temperature of the catalyzer 7 to the activation temperature when the power supply to the heater 9 is stopped, but even where either one of the relationships illustrated in FIGS. 5 and 6 is used, the catalyzer use period L must be found. Preferably, a period representing an increase in the activation temperature of the catalyzer 7 with a good correspondency be used as the catalyzer use period L, and accordingly, the period to be used as the catalyzer use period L becomes very important. In this regard, if the cumulative running distance of a vehicle becomes longer, or if cumulative running time of a vehicle becomes longer, since the catalyzer 7 deteriorates accordingly, it is considered that the cumulative running distance or the cumulative running time of a vehicle can be used as the catalyzer use period L. In addition, if the temperature of the catalyzer 7 becomes higher, and further, the time for which the catalyzer 7 is maintained at a high temperature becomes longer, since the catalyzer 7 has accordingly deteriorated, it is considered that the product of the time for which the catalyzer 7 is maintained at a high temperature and the temperature of the catalyzer 7 during this time can be used as the catalyzer use period L. It is unclear which is the best of the above-mentioned various way at the present stage, but according to current experience it appears to be most preferable to use the cumulative running distance as the catalyzer use period L.

Figure 7:
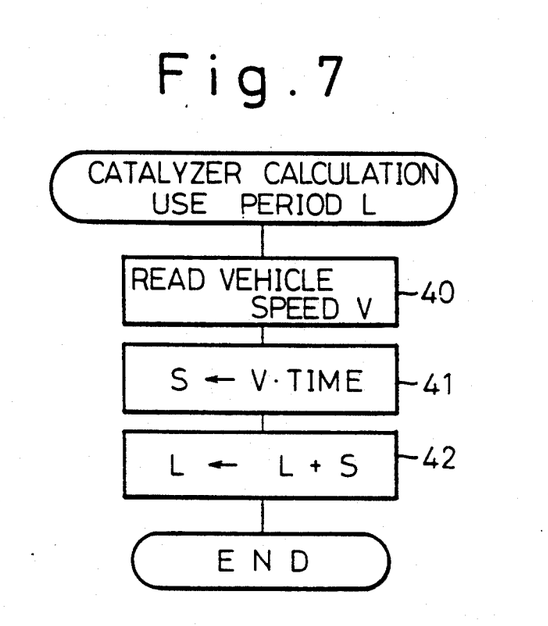
FIG. 7 is a flow chart for calculating the catalyzer use period.

FIG. 7 illustrates a routine for calculating the catalyzer use period L, where the cumulative running distance is used as the catalyzer use period L. This routine is processed by sequential interruptions executed at predetermined fixed intervals TIME.

Referring to FIG. 7, in step 40, the vehicle speed V calculated from the output pulses of the vehicle speed sensor 10 is read by the CPU 24. Then, in step 41, the running distance S is calculated by multiplying the vehicle speed V by the interruption fixed interval TIME. Then, in step 42, the cumulative running distance L is calculated by adding S to L, and this cumulative running distance L is stored in the back-up RAM 26.

Figure 8:
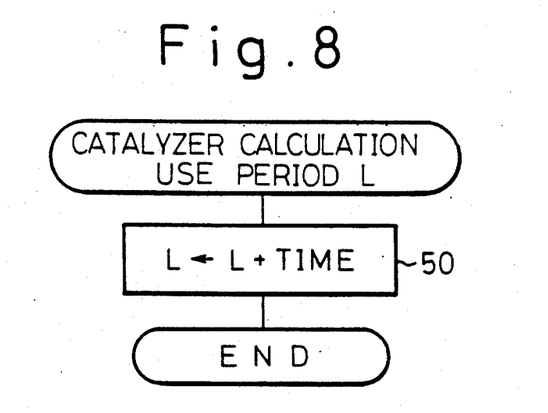
FIG. 8 is a flow chart for calculating the catalyzer use period.

FIG. 8 illustrates a routine for calculating the catalyzer use period L where the cumulative running time is used as the catalyzer use period L. This routine is also processed at sequential interruptions which are executed at predetermined fixed intervals TIME.

Referring to FIG. 8, in step 50, the cumulative running time L is calculated by adding the fixed interval TIME to L, and this cumulative running time L is stored in the back-up RAM 26.

Figure 9:
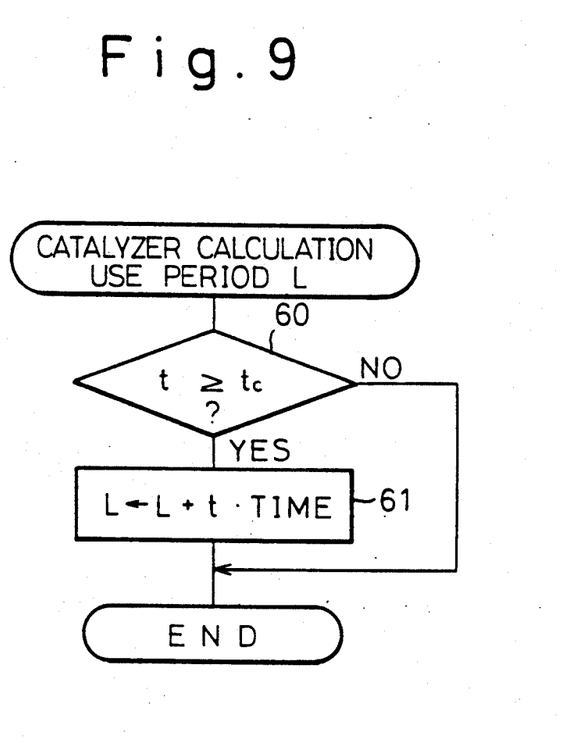
FIG. 9 is a flow chart for calculating the catalyzer use period.

FIG. 9 illustrates a routine for calculating the catalyzer use period L where the product of the time for which the catalyzer 7 is maintained at a high temperature and the temperature of the catalyzer 7 during this time is used as the catalyzer use period L. This routine is also processed at sequential interruptions which are executed at predetermined fixed intervals TIME. Where this routine is used, it is necessary to detect the temperature t of the catalyzer 7.

Referring to FIG. 9, in step 60, it is determined whether or not the temperature t of the catalyzer 7 is higher than a predetermined temperature $t_c$ which, for example, causes the catalyzer 7 to deteriorate. If $t \geq t_c$, in step 61, the temperature t is multiplied by the fixed interval TIME of the interruption, and the catalyzer use period L is calculated by adding the result of multiplying t·TIME to L. This catalyzer use period L is stored in the back-up RAM 26.

To calculate the catalyzer use period L, any one of the routines illustrated in FIGS. 7 through 9 can be used. FIG. 5 and 6 illustrate the case where the catalyzer use period L is calculated by using the routine illustrated in FIG. 7, but the curved lines, which are similar to those illustrated in FIGS. 5 and 6, are obtained even where the catalyzer use period L is calculated by using the routine illustrated in FIGS. 8 or 9.

Figure 10:
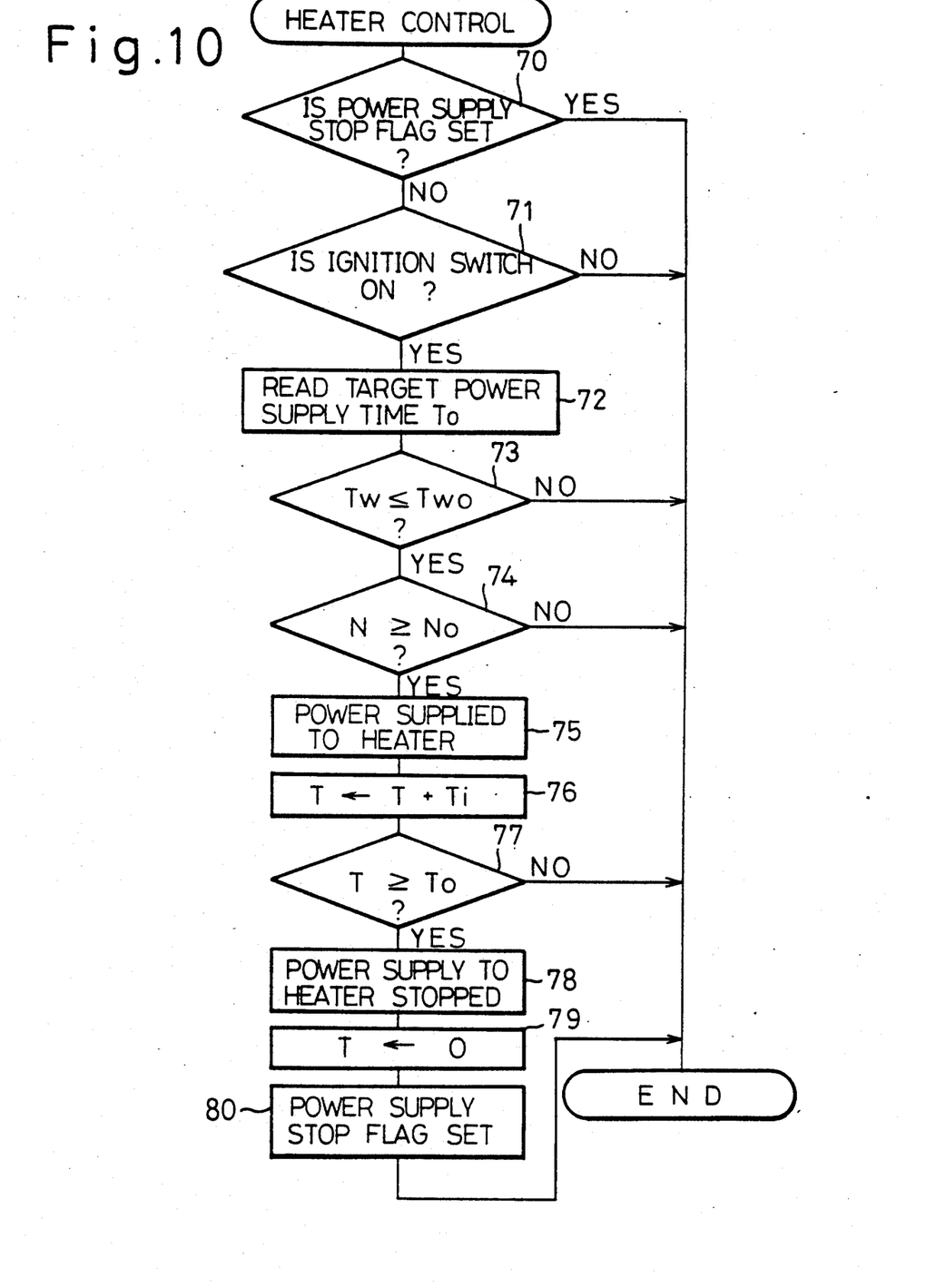
FIG. 10 is a flow chart of a routine for controlling the heater.

FIG. 10 illustrates a heater control routine where the relationship illustrated in FIG. 5 is used in the engine illustrated in FIG. 1, and this routine is processed by sequential interruptions which are executed at predetermined fixed intervals Ti. In this case, the relationship illustrated in FIG. 5 is stored in the ROM 22 in advance.

Referring to FIG. 10, in step 70, it is determined whether or not the power supply stop flag is set. When the routine initially goes to step 70, since the power supply stop flag is in a reset state, the routine goes to step 71, and it is determined whether or not the ignition switch 13 is ON. When the ignition switch 13 is ON, the routine goes to step 72, and the target power supply time $T_0$ corresponding to the catalyzer use time L, illustrated in FIG. 5, is read in the CPU 24. Then, in step 73, it is determined on the basis of the output signal of the coolant temperature sensor 11 whether or not the temperature of the cooling water of the engine Tw is lower than a predetermined temperature Two, for example, 70° C. If Tw≦Two, the routine goes to step 74, and it is determined on the basis of the output signal of the engine speed sensor 12 whether or not the engine speed N is higher than a predetermined speed No, for example, 400 r.p.m. If N≧No, it is determined that the engine has begun to rotate under its own power, and the routine goes to step 75. In step 75, the semi-conductor switch 30 is made ON, and thus power is supplied to the heater 9.

Namely, when Tw>Two, it is considered that a long time has not elapsed after the engine was stopped, and therefore, the temperature of the catalyzer 7 is still high. Accordingly, when Tw>Two, power is not supplied to the heater 9. In addition, preferably the temperature of the catalyzer 7 reaches the activation temperature when the engine begins to rotate under its own power, but to this end, the power supply to the heater 9 must be started at a time earlier than a time at which the engine begins to rotate under its own power, by the target power supply time To. In this case, however, since the vehicle driver must wait until the target power supply time To has elapsed before starting the engine, this is inconvenient for the vehicle driver. Accordingly, the power supply to the heater 9 is started when the engine begins to rotate under its own power.

If the power supply to the heater 9 is started, the routine goes to step 76. In step 76, the fixed interval Ti of the interruption is added to a time T, and thus the elapsed time T after the power supply to the heater 9 was started is calculated. Then, in step 77, it is determined whether or not the elapsed time T has reached the target power supply time To. When the elapsed time T has reached the target power supply time To, the routine goes to step 78. In step 78, the semi-conductor switch 30 is made OFF, and thus the power supply to the heater 9 is stopped. Then, in step 79, T is made zero, and in step 80, the power supply stop flag is set.

Figure 11:
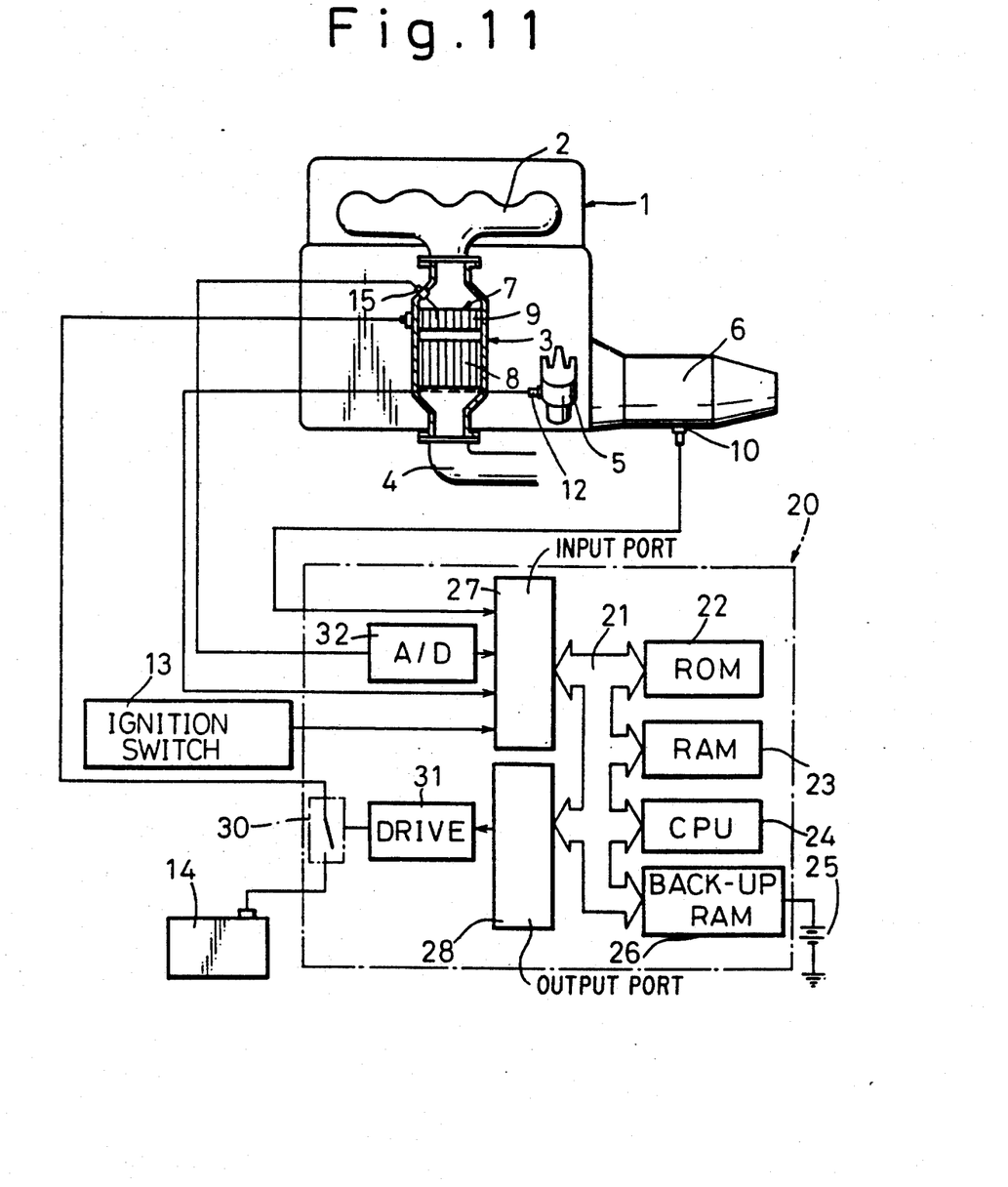
FIG. 11 is a general view of another embodiment of an engine.
Figure 12:
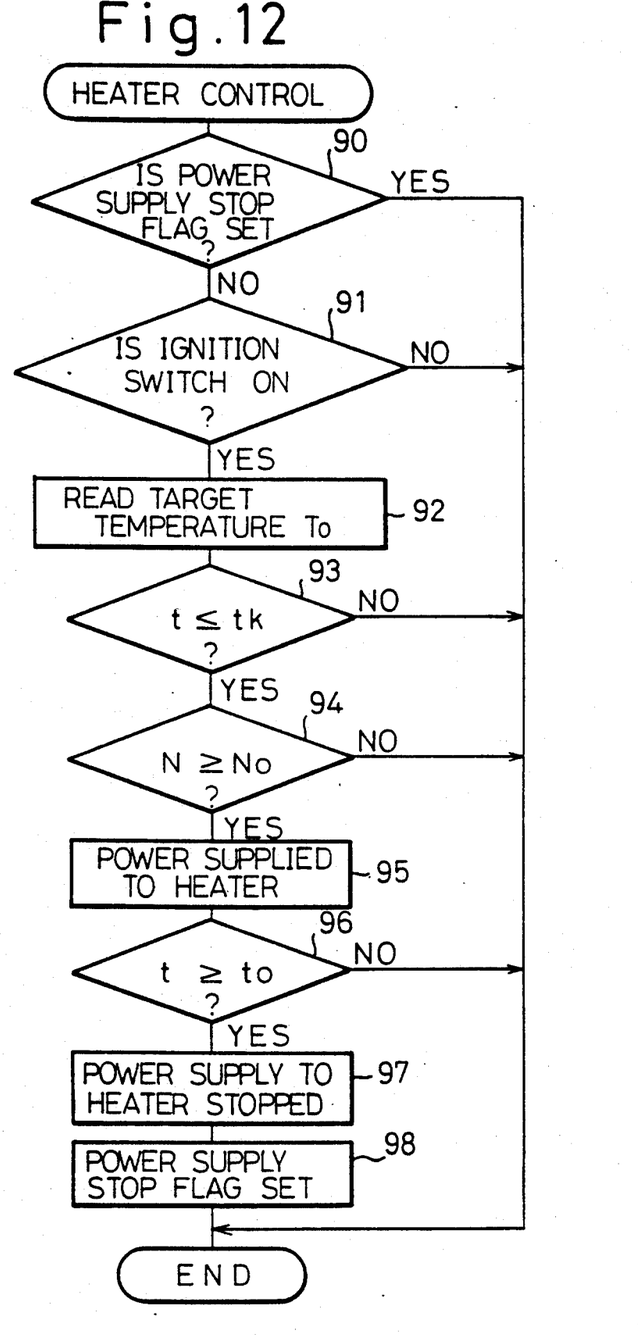
FIG. 12 is a flow chart of a routine for controlling the heater.

FIG. 11 illustrates another embodiment. In this embodiment, similar components are indicated by the same reference numerals as used in FIG. 1. As illustrated in FIG. 12, in this embodiment, a temperature sensor 15 comprising a thermocouple for detecting the temperature of the catalyzer 7, i.e., the temperature of the catalyzer carriers 9a, 9b, is attached to the catalyzer 7. This temperature sensor 15 produces an output voltage proportional to the temperature of the catalyzer carriers 9a, 9b, and this output voltage is input to the input port 27.

FIG. 12 illustrates a heater control routine where the relationship illustrated in FIG. 6 is used in the engine illustrated in FIG. 11, and this routine is processed by sequential interruptions which are executed at predetermined fixed intervals. In this case, the relationship illustrated in FIG. 6 is stored in the ROM 22 in advance.

Referring to FIG. 12, in step 90, it is determined whether or not the power supply stop flag is set. When the routine initially goes to step 90, since the power supply stop flag is in a reset state, the routine goes to step 91, and it is determined whether or not the ignition switch 13 is ON. When the ignition switch 13 is ON, the routine goes to step 92, and the target temperature $t_o$ corresponding to the catalyzer use time L, illustrated in FIG. 6, is read in the CPU 24. Then in step 93, it is determined on the basis of the output signal of the temperature sensor 15 whether or not the temperature t of the catalyzer carriers 9a, 9b is lower than a predetermined temperature $t_k$. If $t \leq t_k$, the routine goes to step 94, and it is determined on the basis of the output signal of the engine speed sensor 12 whether or not the engine speed N is higher than a predetermined speed No, for example, 400 r.p.m. If $N \geq No$, it is determined that the engine has begun to rotate under its own power, and the routine goes to step 95. In step 95, the semi-conductor switch 30 is made ON, and thus power is supplied to the heater 9.

In this embodiment, the temperature of the catalyzer carriers 9a, 9b is detected, and accordingly, it is possible to correctly detect whether or not the temperature of the catalyzer 7 has reached the activation temperature thereof. When the temperature of the catalyzer 7 is not much lower than the activation temperature, i.e., when $t > t_k$, the temperature of the catalyzer 7 reaches the activation temperature in a relatively short time. Accordingly, in this case, power is not supplied to the heater 9.

If the power supply to the heater 9 is started, the routine goes to step 96. In step 96, it is determined whether or not the temperature t of the catalyzer carriers 9a, 9b has reached the target temperature $t_o$. When the temperature t of the catalyzer carriers 9a, 9b has reached the target temperature $t_o$, the routine goes to step 97. In step 97, the semi-conductor switch 30 is made OFF, and thus the power supply to the heater 9 is stopped. Then, in step 98, the power supply stop flag is set.

As mentioned above, in the embodiments according to the present invention, it is possible to rapidly increase the temperature of the catalyzer 7 to the activation temperature thereof regardless of whether the catalyzer 7 is new or has deteriorated. Accordingly, it is possible to purify exhaust gas at an early stage after the engine is started. In addition, since unnecessary power is not supplied to the heater 9, there is no danger that the catalyzer 7 will be over-heated, and that unnecessary power from the battery 14 be consumed.

According to the invention, as mentioned above, it is possible to rapidly increase the temperature of the catalyzer to the activation temperature thereof without using unnecessary energy for heating the catalyzer, regardless of whether the catalyzer is new or has deteriorated.

While the invention has been described by reference to specific embodiments chosen for purposes of illustration, it should be apparent that numerous modifications could be made thereto by those skilled in the art without departing from the basic concept and scope of the invention.

We claim:

1. A device for controlling the heating of a catalyzer arranged in an exhaust passage of an engine, said device comprising:
    heating means for heating the catalyzer;
    calculating means for calculating a cumulative period of use of the catalyzer; and
    control means for controlling said heating means in response to a result of the calculation by said calculating means to temporarily heat the catalyzer when the engine is started and to increase an amount of heat applied to the catalyzer by said heating means as said cumulative period of use of the catalyzer becomes longer.

2. A device according to claim 1, wherein the catalyzer comprises a first catalyzer and a second catalyzer downstream of said first catalyzer, and said first catalyzer is heated by said heating means.

3. A device according to claim 1, wherein the catalyzer comprises a metallic thin plate and a metallic corrugated plate which are alternately coaxially wound about a core, and both said metallic thin plate and said metallic corrugated plate carry catalyzer particles thereon, said heating means flowing an electric current through said metallic thin plate and said metallic corrugated plate to thereby heat same.

4. A device according to claim 1, wherein said cumulative period of use of the catalyzer is represented by a cumulative running distance of a vehicle.

5. A device according to claim 4, further comprising means for detecting a vehicle speed, said calculating means calculating said cumulative running distance from said vehicle speed.

6. A device according to claim 1, wherein said cumulative period of use of the catalyzer is represented by a cumulative running time of a vehicle.

7. A device according to claim 1, wherein said cumulative period of use of the catalyzer is represented by the product of a length of time and a temperature of the catalyzer.

8. A device according to claim 7, further comprising means for detecting the temperature of the catalyzer, said calculating means calculating said product by multiplying the length of time for which the temperature of the catalyzer is higher than a predetermined temperature by the temperature of the catalyzer.

9. A device according to claim 1, wherein said control means increases said amount of heat applied to the catalyzer by increasing a time for which power is supplied to said heating means.

10. A device according to claim 9, wherein said control means starts a supply of power to said heating means after an ignition switch is made ON, and said control means stops the supply of power to said heating means when said power supply time has elapsed after the supply of power is started.

11. A device according to claim 10, wherein said control means starts said power supply when an engine speed exceeds a predetermined speed.

12. A device according to claim 11, wherein said control means starts said power supply when the engine speed exceeds the predetermined speed and when a coolant temperature of the engine is lower than a predetermined temperature.

13. A device according to claim 9, further comprising a memory for storing said power supply time which becomes longer as said cumulative period of use of the catalyzer becomes longer.

14. A device according to claim 1, wherein said control means increases said amount of heat radiated to the catalyzer by increasing a target temperature of the catalyzer, which target temperature is reached when a supply of power to said heating means is stopped.

15. A device according to claim 14, further comprising means for detecting a temperature of the catalyzer, said control means starting said power supply after an ignition switch is made ON, said control means stopping said power supply when the temperature of the catalyzer reaches said target temperature.

16. A device according to claim 15, wherein said control means starts said power supply when an engine speed exceeds a predetermined speed.

17. A device according to claim 16, wherein said control means starts said power supply when the engine speed exceeds the, predetermined speed and when the temperature of the catalyzer is lower than a predetermined temperature.

18. A device according to claim 14, further comprising a memory for storing said target temperature which becomes higher as said cumulative period of use of the catalyzer becomes longer.

* * * * *